July 20, 1937.   C. F. BALL ET AL   2,087,679
METHOD OF CLEANING AND PREPARING CONDUITS FOR
THE HANDLING OF PLASTIC CONCRETE MIXTURES
Filed Nov. 24, 1933
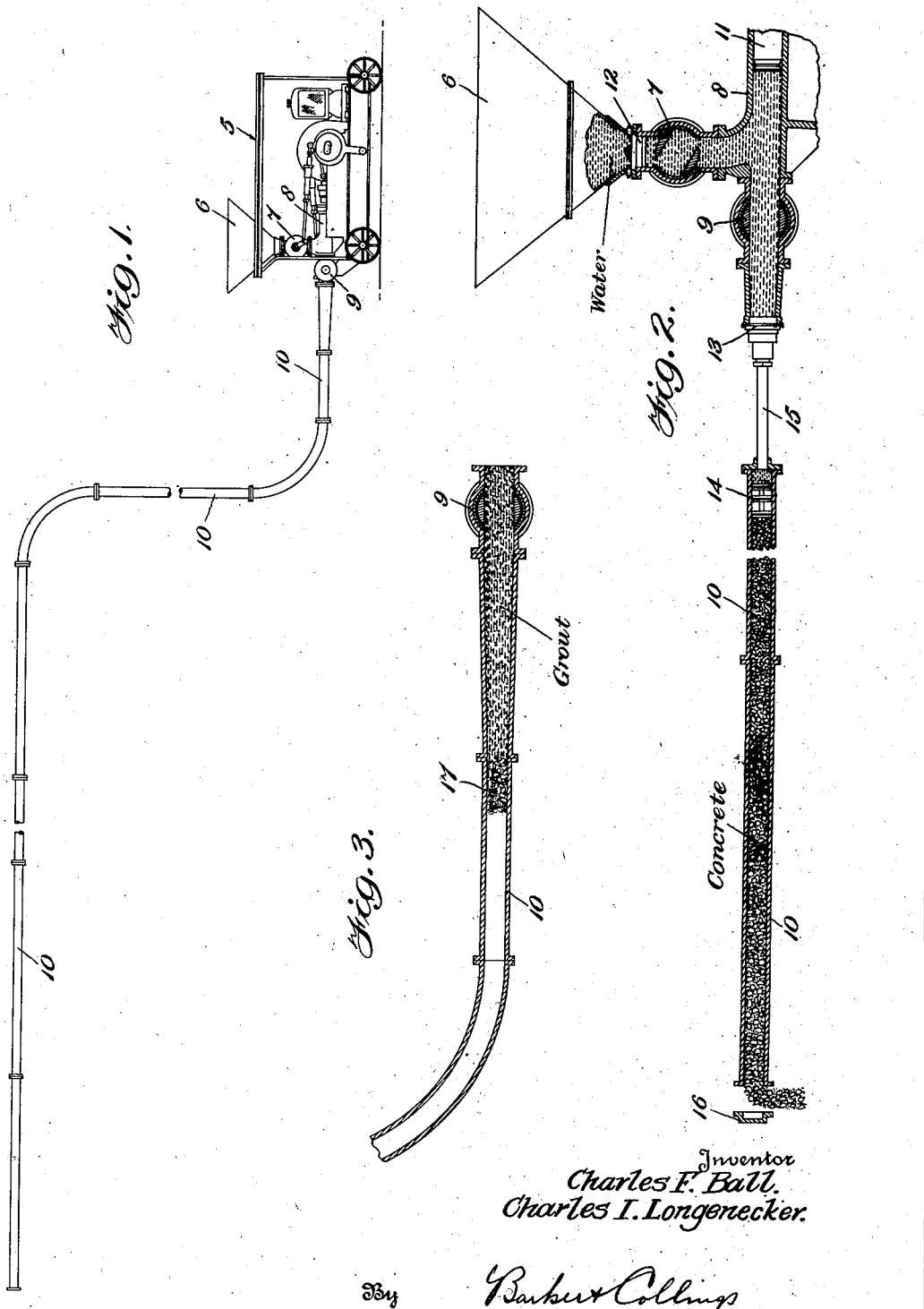
Inventor
Charles F. Ball.
Charles I. Longenecker.
By Barker & Collings
Attorneys Patented July 20, 1937

2,087,679

UNITED STATES PATENT OFFICE 2,087,679

METHOD OF CLEANING AND PREPARING CONDUITS FOR THE HANDLING OF PLASTIC CONCRETE MIXTURES

Charles F. Ball and Charles I. Longenecker, Wauwatosa, Wis., assignors to Chain Belt Company, Milwaukee, Wis., a corporation of Wisconsin Application November 24, 1933, Serial No. 699,632

3 Claims. (Cl. 83—73)

This invention relates to systems for the transportation of plastic concrete mixtures, and has for one of its objects the provision of a simple and inexpensive method of treatment of the conduits and passages of such systems which will effectively prepare and maintain them in condition for use, and will greatly facilitate the travel of the mixture through them.

With the above and other objects in view which will appear as the description proceeds, the invention consists in the novel steps and combinations of steps constituting the method, all as will be more fully hereinafter set forth, and particularly pointed out in the appended claims.

For years much thought and effort have been expended on the forcing of plastic concrete mixtures through closed pipe lines under pressure, to the end that the placement of such mixtures in certain difficult situations might be made easier, and the cost of placement under practically all conditions might be reduced. Several systems employing compressed air or similar fluid for imparting motion to the mixture have been devised, and notwithstanding the relative inefficiency of such pressure medium, its high cost, and other serious drawbacks, one or more of such systems are in limited use today to meet certain peculiar placement problems, e. g., the lining of the arch portions of tunnels.

On the other hand, there has been recently developed a mechanical pump which has successfully handled all ranges of concrete mixtures now commonly employed, and which, because of the considerably lowered cost per cubic yard of concrete placed, indicates the transportation and placement of concrete by pipe line will be much more extensively used in the future, probably largely or wholly displacing such older methods of placement as the "tower", "buggy", and others for many purposes.

Concrete, as defined by the American Concrete Institute, is a "mixture in which a paste of Portland cement and water binds fine and coarse materials, known as 'aggregates' into a rock-like mass as the paste hardens through the chemical action of the cement and the water." This definition is somewhat more limited than the commonly accepted understanding of the word, which is widely used to designate mixtures in which the fine and/or coarse aggregates are held together by binders other than a cement-and-water paste, such for example, as the well known asphaltic concretes. The term "concrete" is also loosely applied, particularly by laymen, to a mixture of fine aggregate and cement-and-water paste, although technically such mixture is more properly termed "mortar"; and even to the cement-and-water paste alone, although this is more properly designated as "grout" or "slurry". In the present specification and claims, the word "concrete" is intended to mean a conglomerate mixture of fine and coarse aggregates with a binder, but excluding the fine aggregate and binder "mortars"; and the term "grout" is used to designate the thin, more or less fluid mixture of cement and water alone. The apparatus and method will be described principally with relation to Portland cement concrete, although not strictly limited thereto.

The "aggregates" referred to above are inert materials, which play no part in the chemical reactions between the water and cement which result in the hardening or "setting" of the mixture, but are employed principally to increase the bulk and reduce the cost of the product. Generally speaking, the larger or "coarser" the large aggregates employed, the cheaper is the concrete. The most commonly used form of fine aggregate is sand, while gravel and crushed rock are the most common forms of coarse aggregate. Any aggregate up to ¼ inch in greatest dimension is considered fine, while coarse aggregates in present commercial usage may range from ¼ inch up to 3 inches or more in greatest dimension. Aggregates ranging above 2 inches will be referred to as "very coarse" for convenience.

The coarse aggregates impart to the mixture a peculiar characteristic known as "stowing". That is to say, if a plastic concrete mixture embodying such aggregate be passing through a pipe or conduit of uniform dimensions under pressure, and it encounters a relatively abrupt partial reduction in the cross sectional area of the passage, either through sudden constriction thereof, or by reason of an obstruction therein, the mixture will not increase its velocity in an effort to pass such constriction or obstruction, as will a liquid or gas, but on the other hand, the coarse aggregates, because of the sudden rearrangement of the relative positions of the individual pieces thereof, will jam or pack at the obstruction and cause a complete stoppage of the flow. The amount of restriction does not have to be very great relative to the cross sectional area of the pipe—a change from a 7 inch pipe to a 6 inch pipe in a distance of 12 inches will produce the "stowing" action with many of the commonly used mixtures—and once the "stowing" has occurred, no amount of pressure behind the mixture will force it through. The pipe or some other portion of the apparatus will break first.

The aggregates cannot be successfully mechanically pumped by themselves any appreciable distance; to be pumpable, the binder, whether it be the cement-and-water paste, asphalt, or the like, must be present. But as long as it is present, and the mixture be traversing a conduit without restriction, it will move freely, and without segregation or other detrimental change in its char- 'acter. It will be discharged after having been pumped distances up to 800 or 1000 feet in just as good condition as when it left the mixer.

It has been found however, that in initially starting a pipe line operation, it is practically impossible to force the mixture any considerable distance through a dry conduit, and it has been determined that this is because the dry walls of the pipe extract the binder, e. g., the water and cement, from the mixture, leaving only the fine and coarse aggregates, at the head of the stream. These, not being pumpable as above explained, constitute obstructions in the pipe which reduce its cross sectional area, and as a result the mixture stows or packs at the head of the stream and movement ceases, even though further back it may be in perfect condition so far as binder content is concerned.

This difficulty may be overcome, for short distances at least, by merely first applying to the surfaces of the conduit walls, a medium, which serves to prevent the extraction of the binder constituents from the mixture. In the case of Portland cement concrete, this medium may be water, which when passed through the pipe in sufficient quantity to wet the surfaces throughout the length thereof, not only prevents the extraction of the binding paste, but also serves in some measure as a lubricant. For longer distances, i. e., 200 feet or over, it is preferred to follow the wetting of the walls with, or to substitute therefor, an application of a medium having certain of the characteristics, and preferably containing some of the constituents of the plastic concrete mixture. For example, in pumping Portland cement concrete, after forcing water through the passages, a relatively small quantity of thin "grout", i. e. water and cement, may be forced through, adhering to the walls of the passages, and acting as a further lubricant for the following concrete mixtures, as well as preventing the extraction of the binder. It is not absolutely necessary to first pass the water through, although if it is not done, more grout will be required.

At other times and under favorable conditions, a thin mortar, i. e. cement, sand and water, or a thin concrete mixture containing more than the normal percentage of water, cement and/or sand may be successfully used at the head of the concrete stream to lubricate the conduit.

Pipe line concrete transportation systems, whether employing fluid pressure or mechanical means for imparting motion to the mixture, must be thoroughly flushed and cleaned at the conclusion of a run, to remove such portions of the mixture as inevitably adhere to the various surfaces, and which if permitted to harden thereon give rise to serious difficulties when the system is next used. Also, in the case of the mechanical pumps above mentioned, which as set up for pumping concrete are not adapted for forcing liquids or gases, means must be provided for getting out of the pipe line that portion of the mixture which is present therein when the supply of concrete from the feed hopper is exhausted. A simple and effective way of removing this last remaining concrete, and at the same time flushing the line, is to break the line adjacent the pump, introduce a free piston or "go-devil" therein, and force it through the conduit by means of water or other fluid under pressure.

This cleaning water may of course be obtained from any source, e. g. from a municipal system if the pressure be high enough, or it may be forced into the concrete pipe line by a special independent pump. However, since municipal systems, if available, ordinarily do not supply a high enough pressure to force out perhaps 800 to 1000 feet of concrete, and in order to obviate the necessity for a separate special pump, it is preferred to convert the concrete pump into a liquid handling pump through the use of special removable water valves, as disclosed and claimed in the co-pending application of Charles F. Ball, filed January 16, 1933, Serial No. 652,076 (now Patent No. 2,012,944, granted September 3, 1935) entitled Concrete pump. In this manner, not only is water under adequate pressure obtained, but it serves to flush out and clean the pump passages, cylinder and valves as well.

The water may be drained from the pump and pipe line at the conclusion of the cleaning operation, but if the succeeding pour is to be made without changing the location of the pump and/or line, it is preferred to cap or otherwise close the discharge end of the line and retain all or a portion of the water in the system, so that the walls of the various passages will be initially wetted when it comes time to start the next operation. Time will thus be saved, for as above explained, when starting with a dry system, water should preferably be run through first to wet the surfaces.

Assuming the wash water to have been retained in the system, immediately prior to the beginning of a new pumping operation, the said water is drained, the supplemental water valves are removed from the pump, and either the concrete mixture is started through before the surfaces have had an opportunity to dry, or preferably, a relatively small quantity of "grout" or mortar, say half a cubic yard, more or less, is forced through, and followed immediately with the mixture containing the coarse aggregates. Much of the "grout" will adhere to and coat the walls of the various passages, effectively lubricating them, and preventing the extraction of the cement-and-water binder of the concrete, so that the latter may be readily forced completely through the pipe line without any "stowing" action.

For purposes of illustration, the steps in the method have been more or less diagrammatically shown in the accompanying drawing in connection with a concrete pipe line system employing a mechanical pump of the type referred to above. In the said drawing, in which like reference characters designate like parts throughout the several views:—

Figure 1 is a diagrammatic side elevational view of one of the mechanical pumps and a typical pipe line layout;

Figure 2 is an enlarged longitudinal sectional-elevational view of a portion of the pump and pipe line, the pump having been provided with the auxiliary water valves, and the step of forcing the scavenging and cleaning water through about to begin; and Figure 3 is a fragmentary view similar to Figure 2, illustrating the beginning of the step of forcing the "grout" through.

In the said drawing 5 indicates generally, a mechanical concrete pump of the type referred to above, provided with a supply hopper 6, inlet valve 7, working cylinder 8 and outlet valve 9 which discharges into a pipe line or conduit 10 which may have both vertical and horizontal portions as indicated in Figure 1. As is well known to those skilled in the art the inlet and outlet valves 7 and 9 in this type of pump are of the oscillating plug type and are arranged to be moved in properly timed relationship to the movements of the piston 11 from a fully open position, in which they impose no restriction whatever to the passage of the concrete mixture, to a partially closed position in which they only partially restrict the passage of the mixture, advantage being taken of the stowing property above mentioned to completely stop the flow. These valves are also provided with certain clearances between their moving parts which, together with the fact that the passage is only partly restricted in the "closed" positions of the valves, renders the pump so highly inefficient for the handling of liquids that it is never so used without the provision of additional liquid tight valves as above mentioned. The amount of the restriction imposed by the valves 7 and 9 may however be readily adjusted so as to enable the pump to handle "grout" and mortar mixtures.

The pumps are highly efficient in the forcing of concrete under pressure through the closed conduit such as 10, but at the conclusion of a pumping operation when the supply of mixture in the hopper 6 is exhausted, movement of that portion of the mixture which is then in the conduit ceases, leaving the conduit substantially completely filled. At this time the conduit may be broken adjacent the pump and the latter may be provided with an auxiliary liquid-handling inlet valve 12, and outlet valve 13, in accordance with the disclosures of the said Ball Patent No. 2,012,944 above mentioned. A free piston or "go-devil" 14 is introduced into the open end of the conduit 10 and a connection 15 installed between such end and the auxiliary outlet valve 13, as illustrated in Figure 2. Water is then introduced into the hopper 6 and the pump started whereby said water is forced by means of the piston 11 through the outlet valve 9, auxiliary outlet valve 13, connection 15 and into the conduit 10 behind the "go-devil" 14, thereby forcing the same through the conduit and discharging that portion of the mixture which is remaining therein. None of the valuable mixture is thus lost.

When the "go-devil" 14 reaches the discharge end of the conduit it is removed and the water which has now filled the conduit, flushing the surfaces thereof, is either drained from the pipe, or if desired, the discharge end of the conduit may be capped or otherwise closed by a suitable member 16 or the end of the conduit may be raised to retain all or a portion of the water in the conduit until the next pumping operation is about to commence. At this time the auxiliary valves 12 and 13, and the connection 15 are removed, the water in the conduit is drained, or forced out, leaving the surfaces thereof in a wetted condition, and a relatively small amount of thin grout is introduced into the hopper 6. The regular pipe having been restored between the pump and the major portion of the conduit, upon operation of the pump the grout will be forced through the conduit and will coat the walls thereof, thus preparing the pipe line for the free passage of the regular concrete mixture embodying the coarse aggregates, which is introduced into the hopper 6 before the grout is exhausted therefrom and follows immediately behind the latter.

In order to restrain the head of the grout stream and not only give the pump some resistance to work against, but also in order to cause the grout to reach all portions of the wall surfaces of the conduit, it is preferred to introduce into the conduit ahead of it a restraining member which may be in the form of a porous, fibrous wad or mass, such for example as a wad of excelsior or burlap indicated at 17 in Figure 3, or the "go-devil" may be used for this purpose.

Instead of draining the water from the conduit prior to the passage of the grout therethrough, said water may be left therein and a solid barrier such as the "go-devil" 14 may be introduced behind the water, ahead of the grout, to keep the two streams separated.

It is obvious that those skilled in the art may vary the precise details of procedure without departing from the spirit of the invention, and therefore it is not wished to be limited to the above disclosure except as may be required by the claims.

What is claimed is:

1. The steps in the method of cleaning and preparing closed conduits for the handling of plastic concrete mixtures embodying substantial proportions of coarse aggregates, which comprise passing a cleaning liquid through said conduit at the conclusion of a pour to flush the same; retaining at least a portion of said liquid in said conduit until ready for the next pour; withdrawing said liquid, and passing a lubricant through said conduit immediately prior to the introduction of the plastic concrete mixture.

2. The steps in the method of cleaning and preparing closed conduits for the handling of plastic concrete mixtures embodying substantial proportions of coarse aggregates, which comprise passing a cleaning and lubricating liquid through said conduit at the conclusion of a pour to expel the concrete remaining therein and clean the conduit; maintaining at least a portion of said liquid in said conduit until ready for the next pour; introducing a lubricant having different characteristics into said conduit behind said liquid; and forcing both of said lubricating media through said conduit immediately ahead of the plastic concrete mixture, while maintaining the leading lubricant stream separated from the following lubricant stream.

3. In the method of moving plastic concrete mixtures embodying a binder constituent and substantial proportions of coarse aggregates through closed conduits under pressure, said aggregates being substantially unmovable in confined streams under pressure in the absence of determinate amounts of said binder constituents, the steps which comprise passing water through said conduit to wet the wall surfaces thereof; introducing into the conduit independently of the concrete mixture a quantity of the binder constituent sufficient to completely pre-coat the said wall surfaces and prevent them from extracting from the mixture when it later passes therethrough a quantity of its binder constituents sufficient to reduce its binder content below the determinate amount necessary to render it movable in a confined stream under pressure; moving said pre-coating binder constituent through said conduit while restraining the head of the stream; and subsequently forcing the concrete mixture through the pre-coated conduit and discharging it with substantially the same binder content it had when it entered the conduit.

CHARLES F. BALL.
CHARLES I. LONGENECKER.